Patented Sept. 8, 1925.

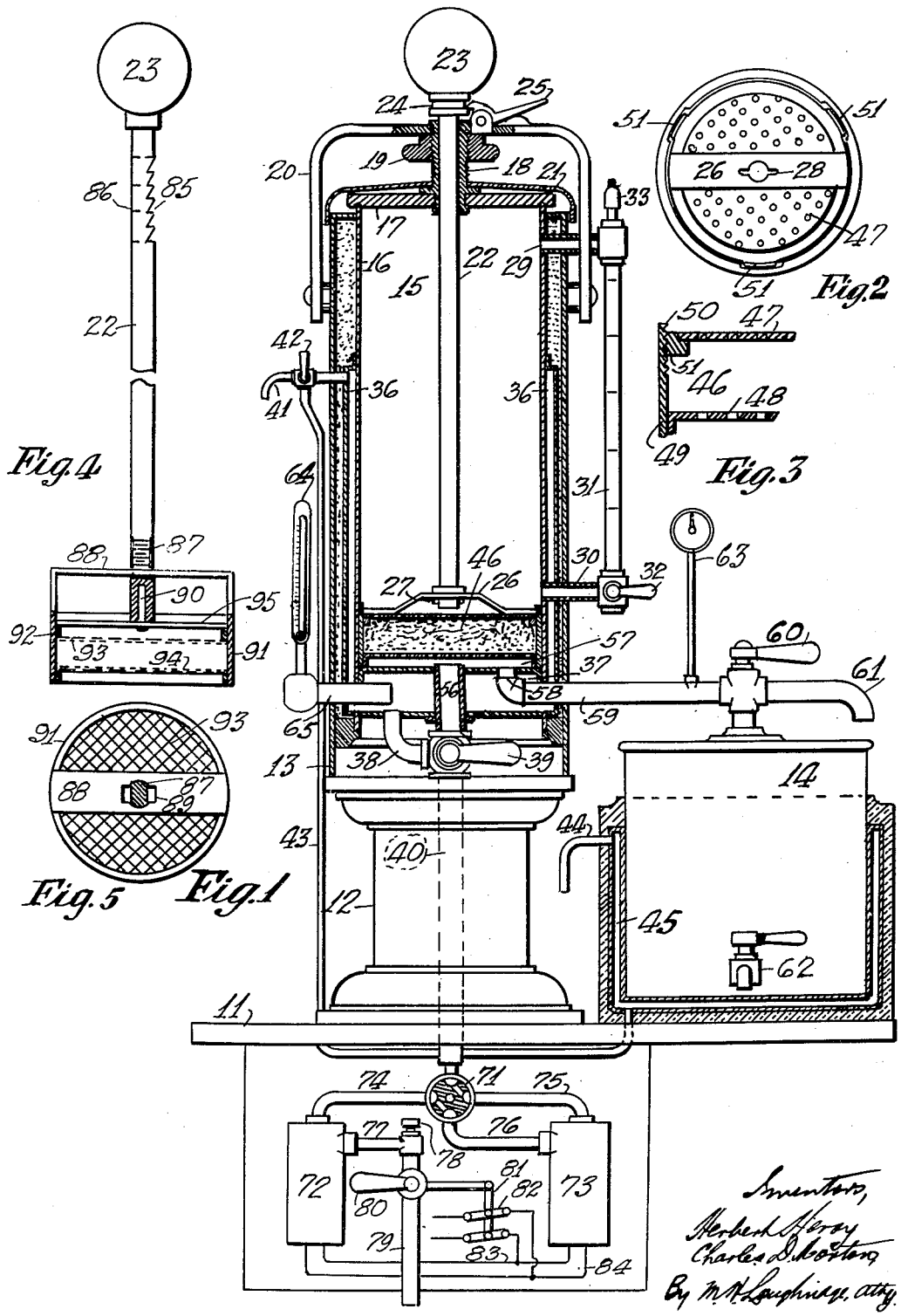

1,552,565

UNITED STATES PATENT OFFICE.

CHARLES D. MORTON, OF NEW YORK, N. Y., AND HERBERT HEROY, OF BELMAR, NEW JERSEY.

MACHINE FOR MAKING INFUSIONS.

Application filed October 14, 1924. Serial No. 743,593.

*To all whom it may concern:*

Be it known that we, CHARLES D. MORTON and HERBERT HEROY, citizens of the United States, and residing, respectively, at New York city, New York, and Belmar, Monmouth County, New Jersey, have invented a certain new and useful Machine for Making Infusions, of which the following is a specification.

This invention relates to a machine for making infusions such as making a coffee beverage and has for an object to obtain uniform conditions in making infusions relating to temperature and quantities and to regulate these conditions with precision. Other objects of the invention will be apparent from the following specification and the accompanying drawings in which Fig. 1, is an elevation, partly in section, of a machine constructed according to my invention, Fig. 2 is a detail plan view of a hollow container for the material from which the infusion is made, Fig. 3 is a fragmentary sectional elevation of Fig. 2, Fig. 4 is an alternative construction of a hollow container and Fig. 5 is a plan view of Fig. 4.

In making a coffee beverage experience shows that best results are obtained when the coffee grounds are subject to an even temperature and the essence of the coffee is extracted by forcing boiling water back and forth through the grounds. These results are obtained in the present invention by enclosing the coffee grounds in a confined space, by pre-heating this container with the grounds from the water jacket after it has been moistened with an initial charge of water and then by forcing the container through the boiling water. Water is applied to the coffee grounds from below and forced against the head of water in the cylinder thereby causing a complete saturation of the coffee grounds.

The machine is heated on the flash boiler principle and, as shown, electricity is used for this purpose. Boiling water is instantly generated by the heating element and is first used in the water jacket to bring the machine up to an even temperature. When the desired temperature is obtained the water is then diverted to the cylindrical receiver where the infusion is made. In this way the machine can be very quickly brought into operation as a comparatively small quantity of water is sufficient for the water jacket.

In the drawings 11 is the bench supporting the machine comprising the pedestal 12 and the body 13 and also the receiver tank 14. The body comprises the cylinder 15 having walls 16 and a cover 17. This cover is tightly held on the end of the cylinder by the stem 18 and the nut 19 engaging the bail 20. A sheet metal cover 21 encloses the entire top of the machine.

A plunger 22 having a weighted knob 23 at the top and a locking collar 24 extends into the interior of cylinder 15 and is attached to the disk shaped container at the bottom. This container comprises a ring 49, Fig. 3, which slides in the cylinder 15 with a comparatively close fit and has a perforated bottom 48 and a perforated top 47. Within this ring and between the top and bottom plates the material from which the infusion is to be made is placed as indicated at 46 in Fig. 1. As the quantity of this material used on a charge may be varied the position of the top plate is adjustable so that the material is confined within the container, reasonable allowance being made for its expansion when moistened. As indicated in Figs. 2 and 3, the ring 49 is threaded at 50 and is engaged by the collar 51 supporting the top plate 47. This engagement is preferably made only at three points as shown at 51 in the plan view where the threads in 49 are cut away to receive the projecting threads 51 in the form of a bayonet joint. The plunger 22 is detachably secured to the bar 26 by the pin 27 which passes through the slot 28 and when turned at right angles secures the container to the plunger so that the former may be moved up and down in the cylinder 15 by knob 23. The plunger 22 is latched in position by the thumb lever 25 engaging the collar 24 as shown.

An alternative construction for plunger and container is shown in Figs. 4 and 5. The container comprises the plain ring 91 to which a coarse and fine wire mesh are secured as indicated at 94. Slidable within ring 91 is another ring 92 to which a coarse and fine wire mesh 93 are secured and to the top of this ring the bar 95 is secured. The bar 88 rises from ring 91 and is provided with a threaded opening to receive the end of plunger 22. The threaded end of the plunger is flattened as indicated at 87 and when aligned with slot 89 the plunger can be passed through the opening and over pin 90 projecting from the bar 95; by turning the plunger through 90° the threads engage bar 88 and the parts are locked together. With this arrangement it will be noted that the threaded end of the plunger adjusts the space in which the material is confined and enables this adjustment to be made from the outside of the machine. The upper end of the plunger is provided with a number of latching notches 85 arranged to be engaged by the latch 25 so that the plunger can be locked at various heights as the material in the container is varied. It is apparent that when the container is at the bottom of the cylinder the height of the plunger projecting above 18 is an index of the quantity of material in the container and for this reason the plunger 22 is graduated at 86 to indicate, for instance, one pound, one-half pound etc.

A water gage 31, preferably graduated, is connected to the cylinder 15 at 29 and 30. The passage to this gage may be closed by the handle 32. A vent 33 is provided at the top to release any steam pressure that may accumulate in the cylinder.

The cylinder 16 is provided with a water jacket 36 for the purpose of maintaining an even temperature in the liquid in the cylinder. This water jacket is expanded in the base as indicated at 37 and is supplied with boiling water through pipe 38 connecting to pipe 40 by the valve 39. Pipe 40 connects with the heating unit hereafter to be described. The overflow from water jacket 36 may be taken off at 41 through valve 42 or led by pipe 43 to water jacket 45 of receiver tank 14 and eventually drained off by the overflow pipe 44.

Boiling water is supplied to cylinder 15 through valve 39 and connection 56 to the shallow chamber 57 below the disk container. From this chamber the prepared liquid is eventually drawn off through connection 58 and pipe 59 through valve 60 to discharge 61 or to the receiver tank 14 where it is drawn off through valve 62. A pressure gage 63 is connected to pipe 59 and the thermometer 64 through connection 65 registers the temperature of the liquid in the water jacket.

With the container in the position shown in Fig. 1 as the boiling water is applied it spreads out in chamber 57 and forces its way through the coffee grounds 46 into cylinder 15. The grounds present a uniform cross-section and are saturated equally as the water rises through them. By applying the boiling water in this manner from below it is apparent that as a head accumulates in cylinder 15 the water is forced through the grounds against this head which tends to equalize the pressure on the grounds and to prevent the water from forming channels as the grounds become plastic. In practice it is found that the wire screens produce a better distribution of water than is obtained with perforated plates.

As illustrated the heating unit comprises electric heating coils 72 and 73 which are connected by wires 83 and 84 with the control switch 82. The water pipe 79 connects through regulating valve 78 and connection 77 with coil 72 and from this coil by pipe 74 to the two way valve 71 which connects to pipe 40. The heating coil 73 connects by pipes 75 and 76 to the two way valve 71. When valve 71 is in the position shown the water from pipe 74 connects to 76 and from 75 connects to pipe 40. The water thus passes through coils 72 and 73 in series. When valve 71 is changed to the opposite position pipe 74 connects to pipe 40 and coil 73 is cut off from the water supply. Valve 80 controls the water supply from pipe 79 and by connection 81 operates the controlling switch 82.

The object of the heating unit is to produce boiling water as required and any means that will produce boiling water other than the arrangement shown is satisfactory for the purpose of the invention.

The operation of this machine is as follows:

The plunger 22 is unlatched from the container and raised to the top of the cylinder, nut 19 is unscrewed and the top with the plunger turns with the bail to the side. A wire hook is used to remove the container from the cylinder. When it has been charged with a measured quantity of coffee grounds it is reinserted in the cylinder, the cover is brought into place, the plunger is lowered and latched to the container, nut 19 is tightened to make the cover air tight and the plunger is latched in the down position by 25. The water supply is turned on at 80 and valve 39 is operated until the water jacket is brought up to the heat required as indicated by the thermometer 64. Boiling water is then turned into chamber 57 until it appears in the bottom of the gage 31. Valve 39 is now moved to reheat the water jacket and compensate for the heat losses in the initial heating of the container. This preliminary heating enables the container to be brought up to the temperature of the boiling water so that the continued water supply thereafter passes through the grounds at a uniform heat. Water is now supplied to chamber 57 to the desired amount as indicated by gage 31 for the quantity of coffee grounds under preparation.

Forcing water once through the coffee grounds does not complete the extraction of the coffee essence and in order to complete the process the plunger 22 is raised one or more times and may be allowed to return by gravity from the weight 23. The passage through gage 31 is preferably closed during this operation.

The coffee grounds are confined in the container during this operation, hence they are subject to a uniform action by the water and cannot float around in the liquid.

The prepared liquid is drawn off as desired at 61 or may be transferred to the receiver tank 14 when the machine is immediately available for use by repeating the process described. It will be noted that the water jacket is comparatively small and as the hot water is obtained on the flash boiler principle, the machine can be quickly brought into use without maintaining a continuous supply of heat.

Having thus described our invention, we claim:

1. In a machine for making infusions, the combination of a closed cylinder, a hollow disk shaped container confining the material from which the infusion is to be made slidable within said cylinder, a nozzle for supplying water to said cylinder below said disk and a rod with a weight at its end for controlling the movement of said container.

2. In a machine for making infusions, the combination of a closed cylinder, a hollow disk shaped container confining the material from which the infusion is to be made slidable within said cylinder, a nozzle for supplying water to said cylinder below said container, and a rod for controlling the position of said container in said cylinder and means for latching said rod in position.

3. In a machine for making infusions, the combination of a cylinder, a cover for said cylinder, a bail, a screw stem in the axial line of said cylinder engaging said bail for securing said cover in place, a container for the material from which the infusion is to be made in said cylinder and means passing through the centre of said screw stem for moving said container in said cylinder.

4. In a machine for making infusions, the combination of a cylinder with a water jacket, a container confining the material from which the infusion is to be made slidable within said cylinder, an electric water heater and means for selectively directing water from said heater to said water jacket and to said cylinder.

5. In a machine for making infusions, the combination of a cylinder with a water jacket, a container confining the material from which the infusion is to be made in said cylinder, a plurality of electric heating elements for heating a water supply arranged to heat the water in series and means for selectively directing the water supply to said water jacket and to said cylinder.

6. In a machine for making infusions, the combination of a cylinder with a container for the material from which the infusion is to be made, means for reloading said container, means for pre-heating said cylinder after the container is loaded and means for supplying water at an even temperature to said cylinder.

7. In a machine for making infusions, the combination of a cylinder with a container for the material from which the infusion is to be made, an electric heating element and a water supply associated with said cylinder and means whereby said cylinder is preheated by said water supply after the container is loaded and means for supplying water at an even temperature to said cylinder.

Signed at New York, N. Y., this 9th day of October, 1924.

CHARLES D. MORTON.
HERBERT HEROY.